United States Patent [19]
Hay et al.

[11] Patent Number: 6,051,671
[45] Date of Patent: Apr. 18, 2000

[54] CLEAN CONTAINERS

[75] Inventors: Henry F. Hay; Tony Tikuisis, both of Calgary, Canada

[73] Assignee: Nova Chemicals Ltd., Alberta, Canada

[21] Appl. No.: 09/047,810

[22] Filed: Mar. 24, 1998

[51] Int. Cl.[7] .......................... C08L 23/00; C08L 23/04; C08L 23/10; C08L 23/18; C08K 5/13

[52] U.S. Cl. .................. 526/348.6; 524/570; 524/579; 524/582; 524/585; 526/351; 526/352

[58] Field of Search .................................. 526/348.6, 351, 526/352; 524/570, 579, 582, 585

[56] References Cited

U.S. PATENT DOCUMENTS

| | | | |
|---|---|---|---|
| 4,302,566 | 11/1981 | Karol | 526/125 |
| 4,543,399 | 9/1985 | Jenkins, III et al. | 526/70 |
| 4,588,790 | 5/1986 | Jenkins, III et al. | 526/70 |

FOREIGN PATENT DOCUMENTS

| | | |
|---|---|---|
| 871193 | 5/1971 | Canada . |
| 876181 | 7/1971 | Canada . |
| 991798 | 6/1976 | Canada . |
| 0294184 | 7/1988 | European Pat. Off. . |
| 95/27754 | 10/1995 | WIPO . |
| WO 9527754 | 10/1995 | WIPO . |

OTHER PUBLICATIONS

CA 135:116680, High–purity Chemicals Containers with Good Mechanical Strength, Barrier Properties, and light shielding with very low leachable particulate contents.
CA 124:58587, Plastic Containers for High–purity Solvents.
CA 127:18496, High–purity Resin Compositions, Moldings, Packaging Materials, and Gloves used with High Purity Chemicals.

*Primary Examiner*—Fred Zitomer
*Attorney, Agent, or Firm*—Kenneth H. Johnson

[57] ABSTRACT

The present invention provides containers for chemicals which require a high purity, such as chemicals for use in manufacturing computer chips and pharmaceuticals. Such containers should not contaminate the contents due to extraction or other phenomena. The present invention provides a container having a low metals content and a low hydrogen peroxide extractables.

18 Claims, No Drawings

CLEAN CONTAINERS

FIELD OF THE INVENTION

The present invention relates to drums for materials, particularly chemicals requiring a high purity. In some industries such as the computer industry and the fine chemical industry some chemicals tend to leach additives and possibly low molecular weight oligomers from the material lining the inner surface of the drum. The present invention is directed to drums having at least an inner layer having a low $H_2O_2$ extractables content as determined following FDA procedures, a low content of residual metals, including heavy metals and low levels of a stabilization package.

BACKGROUND OF THE INVENTION

Chemical Abstract 125:116680 of JP 08 113678A2 published 960507, assigned to Aicello Chemical Co. teaches containers for high purity chemicals which contain a light shielding compound selected from the group consisting of carbon black and $TiO_2$. Additionally, the container contains an inner barrier layer selected from the group consisting of nylon (6/66) and maleated polyethylene. The reference teaches against an inner layer comprising a non-functionalized polyolefin.

Chemical Abstract 124:58587 of Japanese Patent 07 257540 A2 published 951009 discloses containers for high purity solvents having an interior liner of a high density polyethylene (0.940–0.970 g/cm$^3$) and a weight average molecular weight (Mw) (gel permeation chromatography) from 12×10$^4$ to 26×10$^4$ with less than 2.5 weight % of the polymer having a molecular weight less than or equal to 1,000. The polymers contain a neutralizing agent, antioxidant and light stabilizer each at less that 0.01 weight %. The neutralizing agent appears to be calcium stearate. The polyolefins used in the inner or liner layer of the drums of the present invention do not contain calcium stearate.

Chemical Abstract 127:18496 of Japanese patent 09 095565 published 970408 teaches polyethylene for use in high purity applications packaging material and gloves having less than or equal to 0.5 weight % of the polymer having a molecular weight less than or equal to 1,000 and less than or equal to 0.01% of neutralizing agents, antioxidants and light stabilizers and less than or equal to 5.0 weight % of a lubricant of an olefin polymer having a number average molecular weight (Mn) greater than or equal to 2,000 and particles having a diameter of greater than or equal to 1.0 μm and a surface area of less than or equal to 500 cm$^2$. The polyolefin of the inner layer of the container of the present invention does not contain any lubricant.

WO 95/27754 published 951019 teaches high density polyethylene carbon black pigmented container for high purity chemicals. The polyolefin liners in the containers of the present invention do not contain carbon black as a pigment or light stabilizer.

EP patent application 0 294 184 published 07.12.88 teaches and claims a multilayer container in which the inner layer comprises a fluorinated polymer or a polymer comprising vinylidene fluoride. This teaches away from the container of the present invention in which the inner layer does not comprise a fluorinated polymer.

Accordingly the present invention seeks to provide a container for high purity applications in which the inner layer consists essentially of a polyolefin having a low residual metal, including heavy metals, content, low FDA hexane extractables, and a low level of stabilization package. The layer does not comprise carbon black, a fluorinated polymer nor any calcium stearate.

SUMMARY OF THE INVENTION

Accordingly the present invention provides a container having a volume of up to 75 gallons comprising at least one layer and having an inner surface which is a compound comprising not less than 99.8 weight % of a polyolefin having a density from 0.940 to 0.970 g/cm$^3$, a residual metal content, including heavy metals, of less than or equal to 10 ppm, a melt flow rate $I_{21}$ from 4.0 to 6.5 dg/min, a melt flow ratio of $I_{21}/I_5$ from 20 to 35; up to 0.25 weight % of a stabilization package comprising one or more members selected from the group consisting of antioxidants and light stabilizers, said compound having 48 hour 30% $H_2O_2$ extractables of less than 0.015 weight %.

BEST MODE

As used in this specification 48 hour 30% $H_2O_2$ (hydrogen peroxide) extractables means an extraction method on a 3.5 mils (=87.5 μm=0.0875mm) thick compression molded film of sample to be tested following FDA Procedures. The method is a direct measurement of the extractables obtained rather than a weight loss method. According to the procedure a 5 to 10 g sample polymer compression molded into a 3.5 mils (=87.5 μm=0.0875 mm) thick film is extracted for 48 hours at room temperature (i.e. 21° C.) in a liter of 30% $H_2O_2$. The $H_2O_2$ is then evaporated under a blanket of nitrogen using a steam bath. The resulting residuals are then dried under vacuum for 24 hours and then weighed. One liter of $H_2O_2$ used in the extraction is then evaporated using the same procedure as the sample and the weight of residues in blank the $H_2O_2$ is determined. This weight is then deducted from the weight of residue obtained from the sample to give the weight of extract. The percent of extract based upon the original weight of the sample is then calculated.

The containers of the present invention may have a volume up to 75 gallons. The volume maybe from 1 gallon for fine chemicals such as hydrogen peroxide, sulfuric acid, hydrofluoric acid and ammonium hydroxide. Typically small volume containers would be about 5 gallons. The most common containers would be 55 gallon drums.

Polyolefins which may be suitable for use in accordance with the present invention may be prepared using a variety of procedures including low pressure gas phase, slurry phase polymerization and low pressure solution polymerization.

The polymers may be prepared using a low pressure gas phase polymerization process such as that disclosed in a number of patents in the name of Union Carbide Corporation including for example Canadian Patent 871,193 issued May 18, 1971 directed to the use of polyhydrocarbyl aluminum oxide catalysts in a fluidized bed (e.g. aluminoxane); Canadian Patents 876,181 issued Jul. 20, 1971 and 991,798 issued Jun. 22, 1976 directed to polymerizations using a bis (cyclopentadienyl) chromium (e.g. metallocene type compounds) in the polymerization of ethylene, and the more familiar U.S. Pat. No. 4,302,566 issued Nov. 24, 1981 to Karol et al. (gas phase LLDPE) and U.S. Pat. No. 4,543,399 issued Sep. 24, 1985 and U.S. Pat. No. 4,588,790 both in the name of Jenkins, III relating to condensed mode of operating (CMO) a gas phase polymerization. Typically in a gas phase polymerization a fluidized bed of catalyst and polymer at pressures up to 1000 psi (6.895×10$^3$ kPa), preferably from 150 to 300 psi (1.034×10$^3$ to 2.068×10$^3$ kPa), temperatures from about 90° C. to 115° C. in a gaseous stream comprising an inert gas, typically nitrogen, monomer, typically ethylene and one or more of butene (1-butene) and hexene (1-hexene) and optionally up to about 20 weight % liquids of a volatile hydrocarbon which will evaporate while passing through the fluidized bed to remove the heat of reaction. The catalyst is typically a chromium or titanium catalyst which is activated with one or more reducing agents to a reduced valence state. The polymer is removed from the reactor and devolatilized (e.g. removal of residual monomer) and optionally pelletized.

The polymers may be prepared using a slurry phase process as exemplified by patents in the name of Phillips Petroleum Company. Typically the monomers (e.g. ethylene, butene (1-butene) and octene (1-octene) are dissolved in a hydrocarbyl solvent such as a $C_{4-6}$ hydrocarbon which may be unsubstituted or further substituted by a lower alkyl, typically methyl group together with a catalyst such as a Ziegler-Natta catalyst or possibly a metallocene catalyst and heated to temperatures below which the resulting polymer is not soluble in the solvent (typically less than 120 C.°). The resulting slurry circulates through a continuous loop at pressures of less than about 300 psi ($2.068 \times 10^3$ kPa) and the slurry is permitted to settle in a "leg" and removed from the reaction system. The solvent and polymer are separated and the polymer is recovered.

The polymer may also be prepared using a low pressure solution process. The process is similar in terms of monomers, catalyst and solvent to a slurry process but the temperatures are higher generally from 150° C. to 200° C. and the pressures are higher generally less than 5000 psi ($34.48 \times 10^3$ kPa). The solution passes through one or more autoclave reactors or tubular reactors. The resulting polymer is separated from solvent and residual monomer typically by flashing the solution and the recovered polymer may then be further treated to reduce residual monomer and pelletized.

Typically the polymer will comprise a predominant amount of ethylene or propylene, preferably ethylene, and up to 20, preferably not more than 10, weight % of one or more copolymerizable $C_{4-8}$ olefins. Suitable copolymerizable olefins include alpha olefins such as butene (1-butene), hexene (1-hexene) and octene (1-octene). Generally in the solution or slurry phase processes the co-monomers as selected so that the resulting polymer is not soluble in the diluent or solvent. Typically the diluent or solvent is a $C_{5-6}$ hydrocarbon so that the comonomers for slurry and solution polymers tend to be ethylene and octene. For the gas phase process the monomers should in the vapor phase and should not condense readily on the surface of the forming polymer granules to cause agglomeration and potentially bed destabilization. For gas phase polymers the comonomers tend to be butene and hexene.

The polymer forming the inner layer of the drum should have a residual metal content of less than 10, preferably less than 8, most preferably less than 5 ppm (as typically determined by one or more of inductive coupled plasma emission spectroscopy (ICP); x-ray fluorescence spectroscopy (XRF); and neutron activation (NA)). The residual metals would include heavy metals and catalyst residues such as aluminum, chromium, titanium, vanadium and magnesium. The residual metal content does not include silica (resulting from the use of a supported catalyst).

In accordance with the present invention the polymer should have a density from 0.940 to 0.970 g/cm$^3$, preferably from 0.950 to 0.960 g/cm$^3$. The polymer should have a molecular weight distribution so that it has a melt flow rate at 190° C. under a load of 21 kg through a 2.095 mm (0.0825 inch) orifice (121)) from 4.0 to 6.5 dg/min, preferably from 4.5 to 6 dg/min, most preferably from 5.0 to 5.5 dg/min (see ASTM D 1238). Additionally, the polymer should have a melt flow ratio ($I_{21}/I_5$) or the ratio of the melt flow rates under a force of 21 kg and 5 kg (as determined above) from 20 to 35, preferably from 20 to 30, most preferably from 24 to 28.

Typically polymers having the above flow rates and flow ratios will have a small fraction, typically less than 2 weight %, preferably less than 1 weight %, most preferably less than 0.75 weight % of the polymer having a molecular weight (Mw) less than 3,000.

The drums of the present invention may be of unit body construction so that the inner layer is the same as the base, side walls and top of the drum. The drums of the present invention may be multi-layer or have a separate liner so that the inner layer may be different from the composition of the base, side walls and top of the drum. If the drum is a multi-layer construction or has a liner, the inner layer or liner (e.g. the layer in contact with the contents of the drum) will have a thickness from about 10 to 100 mils (thousands of an inch) (0.0254 cm to 0.254 cm).

If the drum is of unit body construction the entire composition from which the drum is manufactured must be the same as the inner layer. This will place limitations on the amount and type of additives. The inner layer will essentially contain no pigments or fillers (i.e. the inner layer consists essentially of 99.8 weight % of polymer).

If the drum is a multi-layer construction it is permissible to form the outer layer(s) from a composition conventionally used in polyolefin drums including fillers, heat and light stabilizers, pigments and colors and nucleating agents.

While the present invention contemplates liners, from an industry point of view liners may not be desirable. However, the manufacture of liners for existing drums may be less expensive.

In accordance with the present invention the inner layer or the layer in contact with the contents of the drum may contain up to 0.25 weight % (2500 ppm) of a stabilization package. Generally the stabilization package may comprise a primary and secondary antioxidant and UV light stabilizer. Some primary antioxidants generally are hindered phenols. The secondary antioxidants are generally organo phosphites. Some UV stabilizers are hindered amine type stabilizers (HALS) which can function both as an antioxidant and a UV stabilizer.

If the stabilizer package comprises a combination of one or more hindered phenols and one or more phosphite and phosphonite, the one or more hindered phenol stabilizers may be present in amounts up to 0.125 weight % (1250 ppm) and the one or more phosphite and phosphonite stabilizers may be present in amounts up to 0.125 weight % (1250 ppm) preferably less than 0.05 weight % (500 ppm) each.

The stabilization package may comprise a hindered amine stabilizer without a primary antioxidant. The hindered amine stabilizer may be present in amounts up to 0.25 weight % (2500 ppm), preferably less than 0.10 weight % (1000 ppm). Preferably such a hindered amine stabilizer would have a molecular weight (Mw) greater than 1000. Most preferably, the hindered amine stabilizer may be used in amounts less than 0.05 weight % (500 ppm). Preferably the hindered amine stabilizer used in these amounts would have a molecular weight (Mw) of greater than 1500.

Some UV stabilizers (absorbers) include the 2-hydroxybenzophenones and the 2-(2'-hydroxyphenyl)

benzotriazoles. Some hindered phenol type stabilizers include 2-hydroxybenzophenone, 2,4-dihydroxybenzophenone, 2-hydroxy-4-methoxybenzophenone, 2-hydroxy-4-n-octyloxybenzophenone, 2-hydroxy-4-isoctyloxybenzophenone, 2-hydroxy-4-dodecyloxybenzophenone, 2,2'-dihydroxy-4-methoxybenzophenone, 2,2'4,4'-tetrahydroxybenzophenone, 2,2'-dihydroxy-4,4'-dimethoxybenzophenone, 2-hydroxy-4-methoxy-5-sulfobenzophenone, sodium 2,2'-dihydroxy-4,4'dimethoxy-5-sulphobenzophenone, 2-(2'-hydroxy-5-methylphenyl)benzotriazole (sold under the trademark TINUVIN P by CIBA-GEIGY), 2-2'-hydroxy5'-t-octylphenyl-benzotriazole, 2-[2-'hydroxy-3'5'-(di-t-butyl)phenyl] benzotriazole (sold under the trademark TINUVIN 320 by CIBA-GEIGY), 2-[2'-hydroxy-3'5'-(di-t-amyl)phenyl) benzotriazole (sold under the trademark TINUVIN 328 by CIBA-GEIGY), 2-[2'-hydroxy-3',5'-di-(•,•-dimethyl-benzyl)phenyl]benzotriazole (sold under the trademark TINUVIN 900 by CIBA-GEIGY), 2-(3'-t-butyl-2'hydroxy-5'-methyl-phenyl)-5-chlorobenzotriazole (sold under the trademark TINUVIN 326 by CIBA-GEIGY), and 2-(2'-hydroxyl-3',5'-di-t-butyl)5-chlorobenzotriazole (sold under the trademark TINUVIN 237 by CIBA-GEIGY).

Some hindered phenol antioxidants include the di- and polyphenolic stabilizers. These types of antioxidants include 2,2'-methylenebis(6-t-butyl-p-cresol); 1,3,5-trimethyl-2,4,6-tris(3'5'-di-t-butyl-4-hydroxybenzyl)benzene; tetrakis [methylene(3,5di-t-butyl-4-hydroxyhydrocinnamate)] methane; and octadecyl 3,5 di-tert-butyl-r-hydroxyhydrocinnamate.

Some hindered amine light stabilizers include 2-(3',5'-di-tert-butyl-2'-hydroxyphenyl)-5-chlorobenzotriazole; bis(2,2,6,6-tetramethyl-4-piperridinyl)sebacate; bis(1,2,2,6,6-pentamethyl-4-piperidinyl)sebacate; propanedioic acid ((3,5 bis-((1,1-dimethylethyl-4-hydroxyphenyl)methyl)-butyl-, bis(1,2,2,6,6-pentamethyl-4-piperidinyl)ester (or n-butyl-(3, 5-di-tert-butyl-4-hydroxybenzyl)bis-(1,2,2,6,6-pentamethyl-4-piperridinyl)malonate); dimethylsuccinate polymer with 4-hydroxy-2,2,6,6-tetramethyl-1-piperidineethanol; and N-N'-bis(2,2,6,6-tetremethyl-4-piperidinyl)-1,6-hexanediamine, polymer with 2,4,6-trichloro-1,3,5-triazine and 2,4,4-trimethyl-1,2-pentanamine.

A particularly useful hindered amine light stabilizer has the formula shown below. This compound is commercially available from CIBA-GEIGY as CHIMASSORB®944.

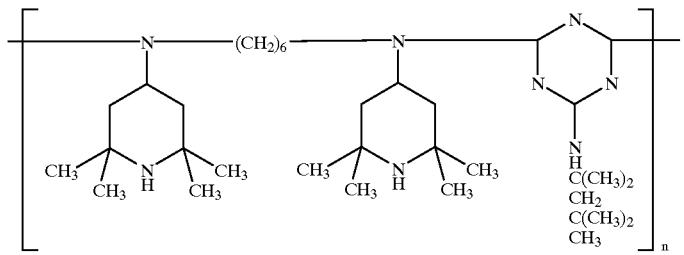

N-N'-bis(2,2,6,6-tetremethyl-4-piperidinyl)-1,6-hexanediamine, polymer with 2,4,6-trichloro-1,3,5-triazine and 2,4,4-trimethyl-1,2-pentanamine; or poly[[6-[(1,1,3,3,-tetramethyl butyl)amino]-s-triazine-2,4-diyl][[(2,2,6,6-tetramethyl-4-piperidyl)imino]hexamethylene[(2,2,6,6,-tetramethyl-4-piperidyl)imino]].

Another useful polyester hindered amine light stabilizer has the formula

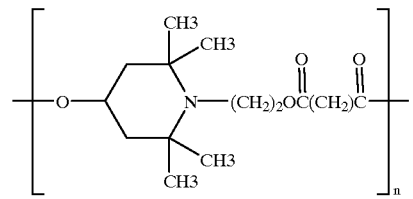

(dimethyl succinate1-(2 hydroxy ethyl 2,2,6,6-tetramethyl-4-piperinol copolymer; or dimethyl succinate polymer with 4-hydroxy-2,2,6,6 tetramethyl-1-piperidineethanol; or succinic acid polymer with 4-hydroxy-2,2,6,6tetramethyl-1-piperidineethanol).

This hindered amine light stabilizer is sold by CIBA-GEIGY as TINUVIN®622.

Another commercially available hindered amine light stabilizer has the formula

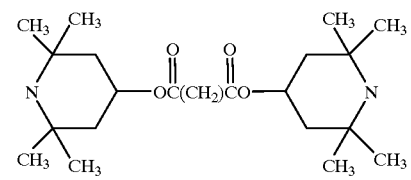

(di-(2,2,6,6-tetramethyl piperidine)succinate or bis(2,2,6,6-tetramethyl piperidine)succinate).

This stabilizer is sold by CIBA-GEIGY as TINUVIN®292.

Another commercially available hindered amine stabilizer has the formula

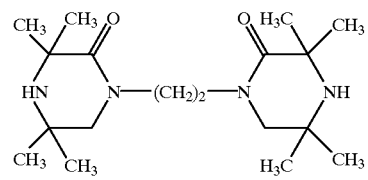

This hindered amine light stabilizer is commercially available from B. F. Goodrich as GOOD-RIGHT® UV 3032.

An additional hindered amine light stabilizer which is commercially available has the formula

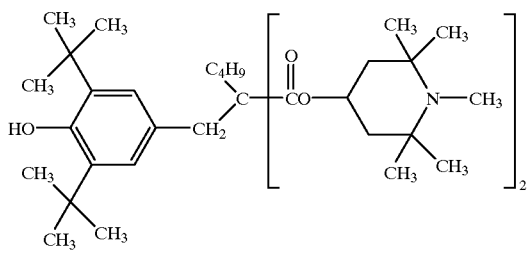

(propanedioic acid ((3,5 bis-((1,1-dimethylethyl-4-hydroxyphenyl)methyl)-butyl-, bis(1,2,2,6,6-pentamethyl-4-piperidinyl)ester).

This light stabilizer is commercially available from CIBA-GEIGY under the trademark TINUVIN 144.

The phosphite stabilizers, which are hydroperoxide decomposers, are typically triaryl phosphites. Generally these compounds may be represented by the formula

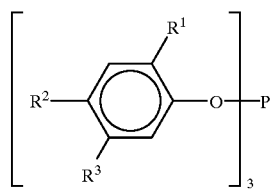

wherein $R^1$ is a radical selected from the group consisting of t-butyl, 1,1-dimethylpropyl, cyclohexyl, and phenyl and one of $R^2$ and $R^3$ is a hydrogen atom and the other is selected from the group consisting of a hydrogen atom, a $C_{1-4}$ alkyl radical which is unsubstituted or further substituted by up to two $C_{1-4}$ radicals, a cyclohexyl radical and a phenyl radical which may be unsubstituted or further substituted by up to two $C_{1-10}$ alkyl radicals. Such radicals for one of $R^2$ and $R^3$ which is other than hydrogen, include methyl radicals, tert-butyl radicals, 1,1-dimethylpropyl radicals, cyclohexyl radicals, phenyl radicals and non phenyl radicals.

Some suitable phosphites include tris-(2,5-di-t-butylphenyl)-phosphite, tris-(2-t-butylphenyl)-phosphite, tris-(2-phenylphenyl)-phosphite, tris-[2-(1,1 dimethylpropyl)phenyl]-phosphite, tris-[2,4-di-(1,1 dimethylpropyl-phenyl]-phosphite, tris(2-cyclohexylphenyl)-phosphite, tris-(2,4-di-t-butylphenyl)-phosphite and tris-(p-nonylphenyl)phosphite.

Another useful class of hydroperoxide decomposer compounds are the phosphonite stabilizers and the fluorinated phosphonites. Some phosphonite stabilizers include tetrakis (2,4-di-tbutylphenyl) 4,4'biphenylenediphosphonite and 2,2'ethylidene(4,6-di-t-butyl)fluorophosphonite. The latter is a particularly preferred hydroperoxide decomposer.

Typically, the polymer compositions of the present invention may be prepared by melt blending. There are several methods which could be used to produce the compositions of the present invention. All the components may be blended in the required weight ratio in a suitable device such as a tumble blender. The resulting blend is then melted in suitable equipment such as an extruder. A master batch could be prepared with some of the polyolefin and some of the other ingredients. The masterbatch is then fed to an extruder and melt blended. In a third method the components of the blend may be metered directly into an extruder either separately or in combination with one or more of the other ingredients.

The extruder may be a twin or single screw extruder. If it is a twin screw extruder it may be operated in a co-rotating mode (i.e. both screws turning in the same direction) or in a counter rotating mode (i.e. the screws rotate in opposite directions).

The specific conditions for operation of any extruder will differ from that of any other extruder. The variations between machines may usually be resolved by non-inventive testing. Typically, twin screw extruders will operate within the following envelope of conditions. The barrel will be heated to a temperature from about 180° C. to 230° C., preferably from 190° C. to 210° C. The screw speed may be as low as about 25 Rpm's. The back pressure on the extruder will be from about 1,000 to 1,300, preferably from 1,100 to 1,250 psi. As noted above the specific conditions for the operation of any specific extruder can readily be determined by one skilled in the art by non-inventive testing in view of the above envelop of conditions.

The extruder will typically extrude the polymer composition as strands which are then cooled and cut into pellets for subsequent use, typically blow molding.

The present invention is illustrated by the following non-limiting examples in which, unless otherwise specified, parts is parts by weight (i.e. grams) and per cent is weight %.

EXAMPLE 1

A commercially available polyolefin resin which is a candidate for use in the manufacture of "ultra" clean drums was analyzed and compared to a resin manufactured by NOVA Chemicals sold under the grade designation HB-W555-A.

The molecular weight distribution of the resins was determined using GPC. The results are set forth in Table 1.

TABLE 1

| Sample | Mn × $10^{-3}$ | Mw × $10^{-3}$ | Mz × $10^{-3}$ | D |
| --- | --- | --- | --- | --- |
| HB-W555-A | 12 | 199 | 970 | 15.9 |
| Commercial Sample | 14 | 142 | 721 | 10.3 |

The total metal content in the commercial resin was in the range of about 3.5 to 4 ppm. The total metal content in HB-W555-A resin was less than about 2 ppm. The metals were predominantly catalyst residues which may include some heavy metals such as Cr. The elemental silicon (from silica catalyst support) was in the order of 100 ppm for HB-W555-A and in the order of about 150 ppm for the commercial sample.

The 30% $H_2O_2$ extractables for the commercial sample determined as described in the disclosure above was 0.0223 weight %. The 30% $H_2O_2$ extractables for HB-W555-A as determined in accordance with the procedures described above in the disclosure was 0.0073 weight %. At a 95% confidence level the 30% $H_2O_2$ extractable content for the HB-W555-A sample is statistically lower than the 30% $H_2O_2$ extractable content for the commercial sample. This significantly superior lower level of $H_2O_2$ extractables clearly indicates the resin of the present invention is suitable for liners or containers for ultra clean containers.

The melt index (according to the procedure described above) of HB-W555-A was 5.31 g/10 min under a force of 21 kg and for the commercial sample was 10.01 g/10 min under a force of 21 kg.

The above shows that the HB-W 555-A has a lower metals and lower silica content which lowers the potential for extraction of these materials into the contents of a container made from this polymer. The polymer has a different (slightly lower molecular weight) and a lower propensity to flow under load. While the HB-W555-A may be somewhat more difficult to process it may also better withstand normal wear and tear or use.

Overall the HB-W555-A has a balance of characteristics which make it suitable for use in the manufacture of containers for materials which must be maintained at a high level of purity (or a low level of contamination).

What is claimed is:

1. A container having a volume of up to 75 gallons comprising at least one layer and having an inner surface which is a compound consisting essentially of not less than 99.8 weight % of a polyolefin comprising at least 80 weight % of a monomer selected from the group consisting of ethylene and propylene and up to 20 weight % of one or more $C_{4-8}$ copolymerizable alpha olefins and said polyolefin having a density from 0.950 to 0.960 g/cm$^3$, a residual metal content, including heavy metals, of less than or equal to 10 ppm, a melt flow rate ($I_{21}$) from 4.0 to 6.5 dg/min, a melt flow ratio of $I_{21}/I_5$ from 20 to 35; and the balance a stabilization package consisting essentially of one or more members selected from the group consisting of: hindered phenols selected from the group consisting of 2,2'-methylenebis(6-t-butyl-p-cresol); 1,3,5-trimethyl-2,4,6-tris (3'5'-di-t-butyl-4-hydroxybenzyl)benzene; and tetrakis [methylene(3,5-di-t-butyl-4-hydroxyhydrocinnamate)] methane; and octadecyl 3,5 di-tert-butyl-r-hydroxyhydrocinnamate; phosphites and phosphonites selected from the group consisting of tris-(2,5-di-t-butylphenyl)-phosphite, tris-(2-t-butylphenyl)-phosphite, tris-(2-phenylphenyl)-phosphite, tris-[2-(1, 1dimethylpropyl)phenyl]-phosphite, tris-[2,4-di-(1, 1dimethylpropyl-phenyl]-phosphite, tris(2-cyclohexylphenyl)-phosphite, tris-(2,4-di-t-butylphenyl)-phosphite and tris-(p-nonylphenyl)-phosphite, tetrakis-(2,4-di-tbutylphenyl) 4,4'biphenylenediphosphonite and 2,2'ethylidene(4,6-di-t-butyl)fluorophosphonite and hindered amine stabilizers selected from the group consisting of 2-(3',5'-di-tert-butyl-2'-hydroxyphenyl)-5-chlorobenzotriazole; bis(2,2,6,6-tetramethyl-4-piperridinyl) sebacate; bis(1,2,2,6,6-pentamethyl-piperidinyl) sebacate; propanedioic acid ((3,5 bis-((1,1-dimethylethyl-4-hydroxyphenyl)methyl)-butyl, bis (1,2,2,6,6-pentamethyl-4-piperidinyl)ester; dimethylsuccinate polymer with 4-hydroxy-2,2,6,6-tetramethyl-1-piperidineethanol; and N-N'-bis(2,2,6,6-tetremethyl-piperidinyl)-1,6-hexanediamine, polymer with 2,4,6-trichloro-1,3,5-triazine and 2,4,4-trimethyl-1,2-pentanamine; said compound having a 48 hour 30% $H_2O_2$ extractables of less than 0.015 weight %.

2. The container according to claim 1, wherein said polyolefin has a melt flow rate $I_{21}$ from 4.5 to 6.0 dg/min.

3. The container according to claim 2, wherein said polyolefin has a melt flow ratio of $I_{21}/I_5$ from 20 to 30.

4. The container according to claim 3 having 48 hour 30% $H_2O_2$ extractables of less than 0.010 weight %.

5. The container according to claim 3, wherein said polyolefin comprises at least 80 weight % of ethylene and up to 20 weight % of one or more monomers selected form the group consisting of butene and hexene.

6. The container according to claim 3, wherein said polyolefin comprises at least 80 weight % of ethylene and up to 20 weight % of one or more monomers selected from the group consisting of butene and octene.

7. The container according to claim 5, comprising multilayer construction, said inner surface having a composition different from the other layers.

8. The container according to claim 5 comprising one layer having the composition of said inner surface.

9. The container according to claim 7, wherein said stabilization package comprises less than 750 ppm of said hindered phenol stabilizer and less than 750 ppm of said phosphite or phosphonite stabilizer.

10. The container according to claim 7, wherein said hindered amine stabilizer has a molecular weight (Mw) greater than 1,500.

11. The container according to claim 8, wherein said stabilization package comprises less than 750 ppm of said hindered phenol stabilizer and less than 750 ppm of said a phosphite or phosphonite stabilizer.

12. The container according to claim 8, wherein said hindered amine stabilizer has a molecular weight (Mw) greater than 1,500.

13. The container according to claim 6, comprising multilayer construction, said inner surface having a composition different from the other layers.

14. The container according to claim 6, comprising one layer having the composition of said inner surface.

15. The container according to claim 13, wherein said stabilization package comprises less than 750 ppm of said hindered phenol stabilizer and less than 750 ppm of said a phosphite or phosphonite stabilizer.

16. The container according to claim 13, wherein said hindered amine stabilizer having a molecular weight (Mw) greater than 1,500.

17. The container according to claim 14, wherein said stabilization package comprises less than 750 ppm of said hindered phenol stabilizer and less than 750 ppm of said phosphite or phosphonite stabilizer.

18. The container according to claim 14, wherein said hindered amine stabilizer has a molecular weight (Mw) greater than 1,500.

* * * * *